(12) United States Patent
Kearney

(10) Patent No.: US 6,481,560 B2
(45) Date of Patent: Nov. 19, 2002

(54) ROBOTIC FEEDING SYSTEM

(76) Inventor: Christopher L. Kearney, 621 E. Bowman St., Wooster, OH (US) 44691

( * ) Notice: Subject to any disclaimer, the term of this patent is extended or adjusted under 35 U.S.C. 154(b) by 30 days.

(21) Appl. No.: 09/871,337

(22) Filed: May 31, 2001

(65) Prior Publication Data

US 2001/0050207 A1 Dec. 13, 2001

Related U.S. Application Data

(60) Provisional application No. 60/210,192, filed on Jun. 8, 2000.

(51) Int. Cl.$^7$ .............................................. B65G 47/14
(52) U.S. Cl. ................... 198/396; 198/397.06; 198/445
(58) Field of Search ........................ 198/369.3, 370.04, 198/396, 397.01, 397.06, 550.3, 443, 445

(56) References Cited

U.S. PATENT DOCUMENTS

| | | | | |
|---|---|---|---|---|
| 3,365,048 A | * | 1/1968 | Ehrlich et al. ...... | 198/397.06 X |
| 4,043,443 A | * | 8/1977 | O'Brien ................... | 198/445 X |
| 5,236,077 A | * | 8/1993 | Hoppmann et al. . | 198/397.06 X |
| 5,314,055 A | * | 5/1994 | Gordon ................... | 198/396 X |
| 5,641,052 A | * | 6/1997 | Lazzarotti et al. ........... | 198/445 |
| 6,168,006 B1 | * | 1/2001 | Bytow ................... | 198/370.04 |
| 6,257,395 B1 | * | 7/2001 | Yokajty et al. ......... | 198/396 X |
| 6,328,523 B1 | * | 12/2001 | Watanabe et al. ....... | 198/396 X |

OTHER PUBLICATIONS

Adept Technology, Inc., *Adept FlexFeeder 250*, Flyer, Jun. 4, 2001.
Seiko Instruments, *Recirculating Parts Feeder*, Brochure, Dec. 1998.
Adept Technology, Inc., *Latest Innovations*, Brochure, Nov. 1997.
Assembly Magazine, *A Flexible Approach*, Nov. 1998.
Hoffman Robotics, *Assembly Technology Expo '99*, Flyer, circa 1999.
Adept Technology, Inc., *Product Catalog*, p. 64–66, Jul. 1999.

* cited by examiner

*Primary Examiner*—James R. Bidwell
(74) *Attorney, Agent, or Firm*—Wood, Herron & Evans, LLP

(57) ABSTRACT

A parts feeder for an automated robotic selection system has a hopper with an integral hopper conveyor for transporting parts to a chute integral with a frame. A feed conveyor transports parts from the chute to a tilting pan which alternately dumps parts received from the feed conveyor to first and second return conveyors. The first and second return conveyors alternately move the parts into the operating range of a robotic arm whereupon the robotic arm selects and picks a part to be reoriented as desired. Parts not picked by the robotic arm are recycled back to the chute where they will be thereafter transported by the feed conveyor to the parts pan. A parts sensor is provided to detect the quantity of parts held within the chute to determine if more parts need to be supplied from the hopper to the parts feeder.

20 Claims, 3 Drawing Sheets

ROBOTIC FEEDING SYSTEM

This invention claims the benefit of U.S. Provisional application Ser. No. 60/210,192 filed Jun. 8, 2000 which is hereby incorporated by reference in its entirety.

FIELD OF THE INVENTION

This invention relates to automated parts feeding systems. More specifically, this invention relates to a mobile robot feeding platform with an alternating parts feeding system.

BACKGROUND OF THE INVENTION

Modern assembly lines are faced with the need to automate more processes, reduce change-over time, spread the cost of capital equipment over more products and cut operating costs. To meet these goals, assembly line operators are turning toward increased equipment flexibility. Vision-guided robotics systems are used to increase the flexibility of assembly line systems. Traditional parts feeding systems are not as flexible as these vision-guided robotic assembly systems. The use of traditional feeding devices, including vibratory bowls, centrifugal bowls and brushes have not been satisfactory for the unique needs of flexible feeding.

During assembly processes, components are typically held in bulk storage. Parts feeders are used to provide manageable numbers of parts from bulk storage to automated processing equipment such as robotic arms and vision systems. Common feeders known in the art are dedicated or semi-dedicated feeders, such as centrifugal or vibratory bowls. These dedicated feeders are more feasible for long production runs and for lines with faster assembly rates, where change-over time and costs are not high priority. Dedicated feeders for small, multiple runs, where flexibility is important, are thus a less attractive solution in assembly line systems. Multiple, dedicated vibratory feeders have been used if feeding of multiple products is needed and the parts themselves do not change. Drawbacks to dedicated feeders are that they are noisy, they take up a great deal of space, and they are not flexible, e.g., mobile or capable of handling a variety of parts.

Intermediate, organized storage containers have also been used to feed parts. These containers are used for banding, blistering and traying of components, but they require specialized handling equipment. This increases the work in process and adds costs because of the intermediate packaging of the products in assembly. Storage costs are increased because there is an increased number of containers needed for staging and warehousing components. The cost of loading the storage devices on the front end of the process makes use of the intermediary containers questionable.

When feeding parts, a system must keep parts sufficiently separated so that robotic arms may distinguish parts and make selections. This requires not only physical separation, but also optical separation. Physical separation keeps the parts from touching during robotic selection and optical separation allows the robotic system to visually distinguish one component from another. Edges of the parts to be processed may also need to be distinguishable to allow a robotic system to effectively pick a part. Edge distinction is generally achieved by various lighting schemes for the feeding system. Because of the need to keep parts separated so that an automated processing system can visually and physically identify and select individual parts from a feeding system, feeding systems known in the art tend to be large, complicated, and costly. In this regard conventional feeding systems are illsuited to small companies in need of flexible assembly systems.

Parts feeding systems include a transporting mechanism to move a part from one point to another, into and through an automated system's operating range. The transporting system is critical to enhance the operability of the robotic and vision systems, thereby, increasing throughput. The transporting surface is generally both the background for the vision-based robotic system as well as the picking surface. The transporting mechanism not only transports parts into the robotic system's operating range, but also moves unpicked parts away from the area. In this manner, the transporting system is also an integral part of the parts recirculation system. Mechanical conveyors known in the art pose difficulties for vision systems because they don't generally have a visually uniform surface that facilitates visual separation of parts. Furthermore, small parts may be easily damaged or caught in conventional flat-top chain conveyors because of large gaps in the conveyor surface.

While some prior art belt conveyors have eliminated seams that interfere with vision based robotic systems, they are designed to operate linearly which makes transporting parts around corners difficult. The speed at which the parts are transported to and through the robot's operating range is directly related to the through-put of the linear belt system. The speed includes the settling time necessary to stabilize components once the transport mechanism has stopped. In a linear belt system there is some period of time in which the system comes to a stop to allow the parts to settle and, therefore, during this time a robotics system is not efficiently selecting parts.

Flexible belt feeders commonly operate in two modes: intermittent and continuous. In the intermittent mode, the feeder is turned on to move components into and out of the operational range of the robotic system. The feeder is then turned off to allow parts to settle and then to allow the robotic system to capture the image and pick the part. In continuous mode, the feeder is always on. The vision system captures the component image upstream of the picking area, and the system tracks the location of the part as it travels to the picking area. The robot arm then picks the part while the component is still moving.

A third, hybrid mode, utilizes a combination of continuous and intermittent modes. For example, one such hybrid mode is to run the feeder continuously until acceptable components are within the vision system's operating range and then intermittently to pick them.

One limitation with conventional feeder systems is that the cycle time of the feeder must not be more than the time it takes the robotic arm to transport the picked part to a placement area and return to the picking area. Also critical is the time it takes the component to settle and the image system to acquire the component. Therefore, there is always a period of time in which a feeding system must allow parts to settle during which time the robotic arm is inactive.

For a feeder operating in continuous mode, the cycle time is the time between successive presentations of acceptable parts. A limitation of this mode is that acceptably oriented parts may pass through the picking area while the robotic arm is in the placement position or while it is moving to or from the picking area. The cycle time for the feeder is extended until both an acceptable part is present and the robotic arm is capable of picking the acceptable part after it has settled and is separated from other parts.

OBJECTIVE OF THE INVENTION

It is therefore an objective of the present invention to provide a parts feeder for a robotic system which overcomes the shortcomings of the prior art.

It is an objective of the present invention to provide an improved flexible parts feeder that is mobile and has a small footprint.

It is a further objective of the present invention to provide an improved flexible parts feeder that accommodates various automated parts processing system configurations at a relatively low capital cost to a user.

It is yet another objective of the present invention to provide an improved parts feeder for a robotic system in which the cycle time of the system is virtually eliminated and which allows for a robotic system to continually have settled parts from which to choose.

SUMMARY OF THE INVENTION

The objectives of the present invention are achieved with a parts feeder for a robotic system in which in one embodiment the parts feeder has a tilting pan as a diverter which receives parts from a feed conveyor to supply parts to return conveyors traveling in a direction opposite to the feed conveyor for alternately returning parts to a hopper. A first conveyor allows a robotic system to pick parts therefrom while a second conveyor returns parts to the hopper and, thereafter, the second return conveyor allows the robotic system to pick parts therefrom while the first return conveyor returns parts to the hopper.

In one aspect of the present invention, a parts feeder has a hopper with an integral hopper conveyor for transporting parts to a chute integral with a frame of the parts feeder. The frame has a second end where parts are received into the chute and then transported by a feed conveyor to a first end of the frame where the parts are presented to a parts diverter. The parts diverter may be comprised of individually actuated gates that push the parts to a desired location of the feeder, or may be any other mechanism suitable for guiding parts. In a preferred embodiment, the parts diverter is a pan that is pivotally attached near the first end of the frame. The parts pan alternatingly dumps parts received from the feed conveyor on to first and second return conveyors located on opposite sides of the parts pan. While the parts pan is dumping parts onto the second return conveyor, the first return conveyor transports parts into an operating range of a robotic arm controlled by a control system to select and pick parts f or desired reorientation.

After a part has been selected and picked by the robotic arm from the first return conveyor, another group of parts received from the feed conveyor into the parts pan is dumped onto the first return conveyor as the first return conveyor simultaneously moves parts not selected by the robotic arm out of the robotic arm operating range. While the first return conveyor is in motion, the second return conveyor locates parts into the robotic arm operating range where the robotic arm selects and picks parts therefrom to be reoriented as desired. The second return conveyor, thereafter, transports the unpicked parts out of the operating range and receives more parts from the parts pan, as described above for the first return conveyor.

Parts not picked by the robotic arm from the first and second return conveyors are recycled into the chute, whereafter they are transported by the feed conveyor back to the parts pan to be once again dumped onto either of the first and second return conveyors. A parts sensor detects the quantity of parts held within the chute to regulate the quantity of parts supplied to the frame by the hopper conveyor.

In another aspect of the invention, the parts feeder may be used with automated visual inspection equipment that is configured to inspect parts positioned within the operating range on the return conveyors.

In yet another aspect of the invention, a mounting plate attached to frame has a plurality of holes which allow a user to attach a shelf at a desired location for mounting a robotic arm, visual inspection equipment and other appropriate components.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
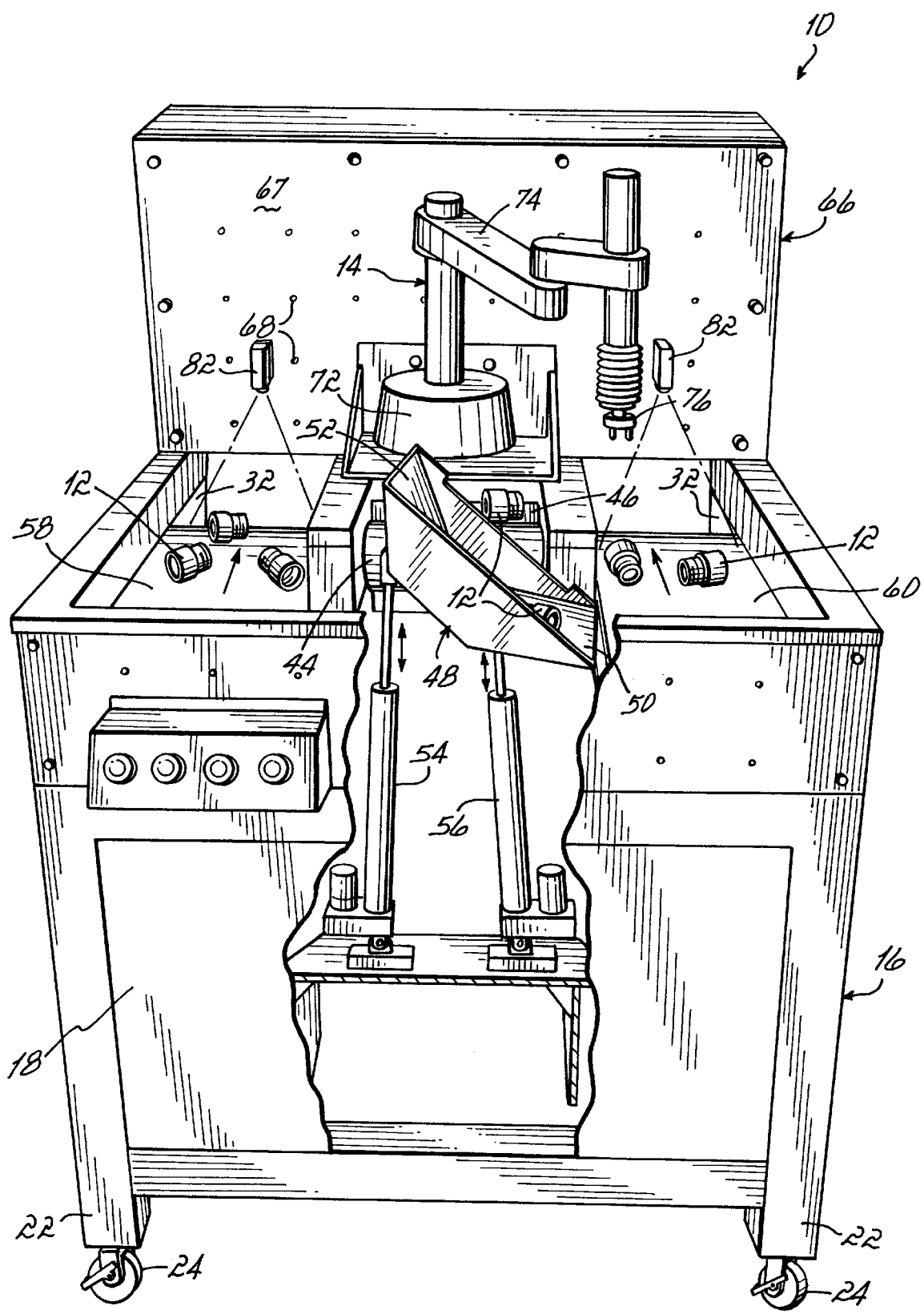
FIG. 1 is front perspective view of one embodiment of the present inventive parts feeder with a partial section.
Figure 2:
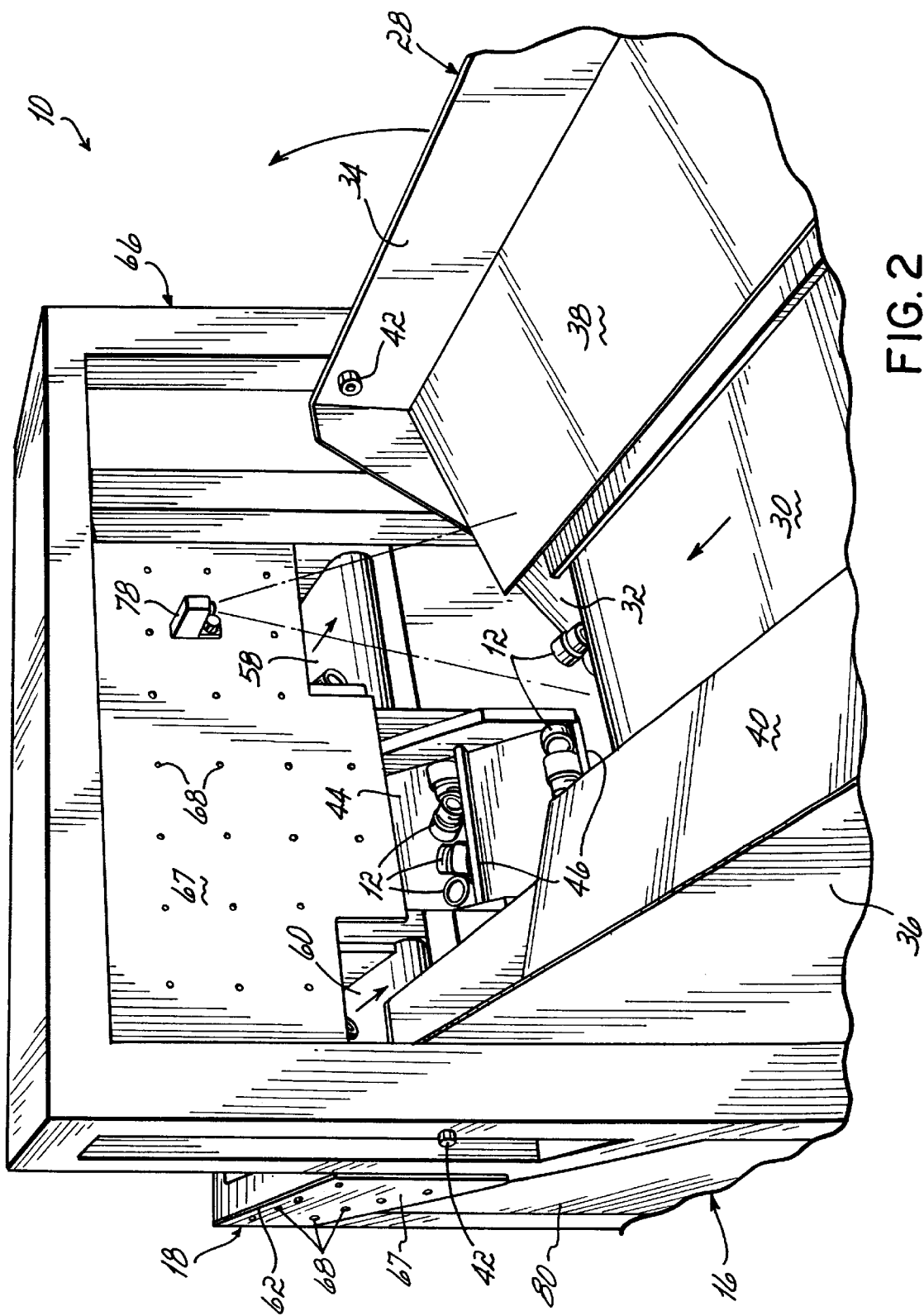
FIG. 2 is a partial perspective rear view of the parts feeder of FIG. 1.
Figure 3:
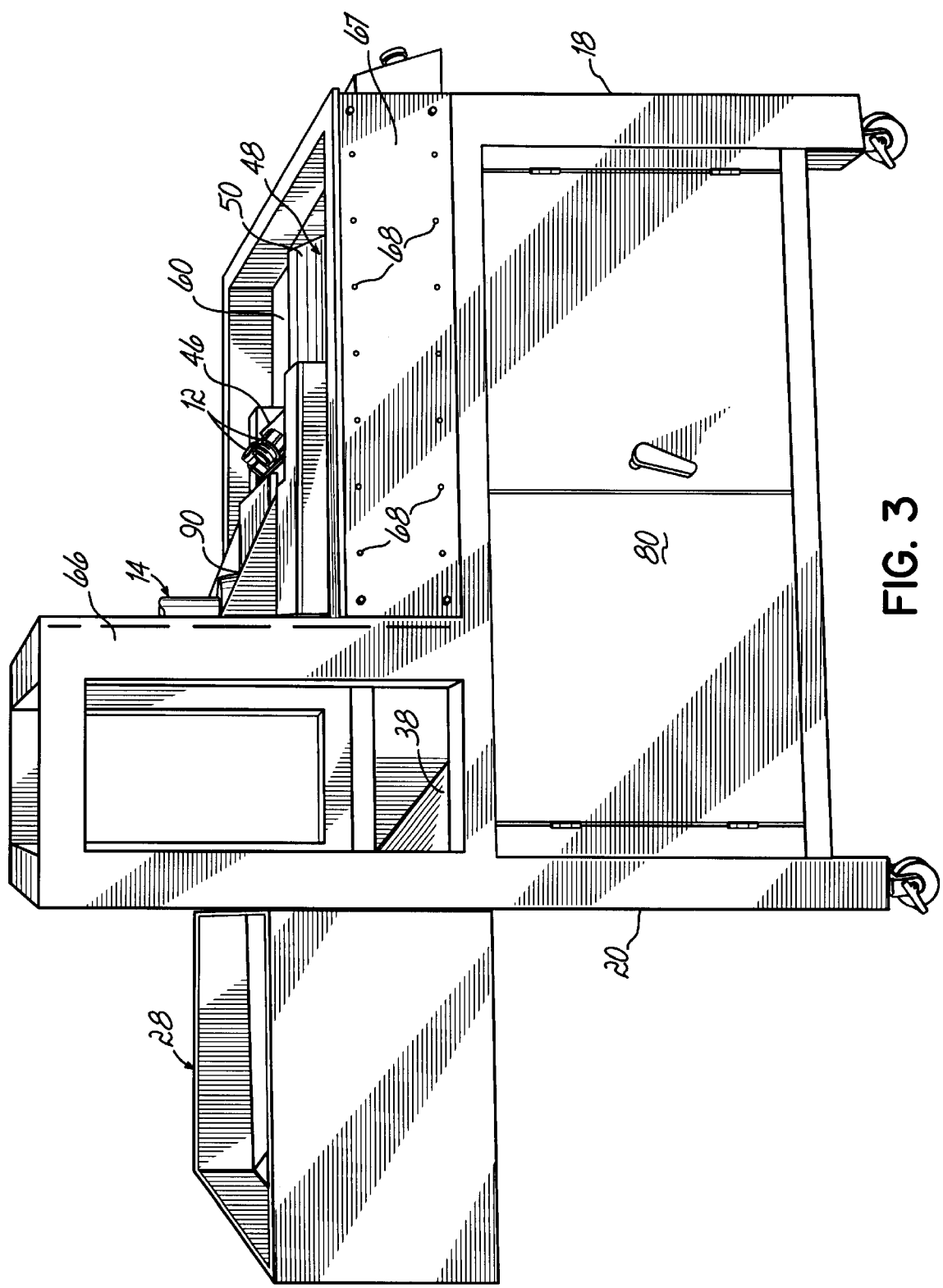
FIG. 3 is a side view of the parts feeder of FIG. 1.

FIGS. 1 through 3 show one embodiment of the present invention. A parts feeder 10 supplies parts 12 to a robotic arm 14 which is linked to a computer control system (not shown). The robotic arm 14 that may be utilized with this invention is any one of a variety of commercially available units, such as the AdeptOne-XL available from Adept Technology, Inc., San Jose, Calif. The parts feeder 10 has a frame 16 with a first end 18 and a second end 20. Frame 16 is supported on legs 22 to which wheels 24 are attached to allow the parts feeder 10 to be easily moved to a desired location. The wheels 24 allow a user to move the parts feeder 10 within a warehouse or factory space depending upon day to day assembly or packaging needs. Alternatively, the frame may be supported on lockable feet when relocation is not desired.

Referring to FIG. 2, a parts hopper 28 transports parts 12 from bulk supply (not shown) to the second end of the frame 16. The hopper 28 has an integral hopper conveyor 30 upon which parts 12 travel to the frame 16 where they are subsequently deposited in a parts chute 32 integral with the frame 16. The hopper 28 has first and second opposed walls 34, 36 having respective first and second slanted portions 38, 40 which direct parts 12 down to the hopper conveyor 30 when parts 12 are loaded into the hopper 28. The hopper 28 is pivotally attached to the frame 16 by suitable fasteners 42 to allow the hopper 28 to be pivoted vertically against the frame 16 when the parts feeder 10 is not in use.

Chute 32 collects the parts 12 supplied to the frame 16 from the hopper conveyor 30. At the bottom of the chute 32, the parts 12 are removed by a feed conveyor 44 having lugs 46 which scoop up parts 12 and transports them from the chute 32 towards the first end 18 of the frame 16. Alternatively, the feed conveyor 44 may be a step feeder which separates and lifts individual parts to the first end 18 of the frame 16.

Referring to FIG. 1, a parts pan 48 catches parts 12 transported by the feed conveyor 44 as parts 12 tumble from the feed conveyor 44 proximate the frame first end 18. The parts pan 48 has first and second spaced sides 50, 52 and is adapted to alternatingly tilt and dump parts over first and second sides 50, 52 under the actuation of first and second pivot actuators 54, 56. The parts pan 48 dumps the parts 12 onto first and second return conveyors 58, 60 for transporting parts 12 to the robotic arm 14 which may have various operational ranges depending on the make and model of the particular robotic system utilized. The first and second return conveyors 58, 60 then transport the parts 12 back to the chute 32 where the parts are recycled to the feed conveyor 44. While the present inventive parts feeder 10 is described herein as having first and second return conveyors 58, 60, the parts feeder 10 may be provided with one, two, or additional return conveyors in accordance with the principles of the present invention for supplying parts 12 for additional assembly or packaging tasks. Furthermore, while one robotic arm 14 is shown, multiple robotic arms could be utilized in the present invention.

Frame 16 is constructed to accommodate a mount or mounting structure 66. In a preferred embodiment, the mounting structure 66 includes plates 67 having a plurality of holes 68 defined therein to allow a attachment of a shelf 70 or various equipment such as robotic arms, visual inspection equipment, or lighting fixtures at any desired location upon the mounting assembly 66. Only one shelf 70 is shown, however additional shelves may be provided as appropriate. The shelf 70 is constructed to accept the robotic arm 14 which is coupled to the control system, for example, a PC-based robotic control software. Alternatively, the robotic arm may be floor-mounted or mounted on an independent structure. Robotic arm 14 has a base 72 to which a jointed arm 74 is attached, the arm 74 having an end effector 76 such as a gripper or other suitable device for handling parts 12 supplied to the return conveyors 58, 60. In a vision based robotic system, a camera 82 or other suitable vision apparatus may be mounted on plate 67 or a mounting arm attached to plate overhanging work area and linked to the robotic computer control system so that parts 12 are located visually in space so that the robotic arm 14 may pick parts 12 located by the vision apparatus. Camera can also be mounted on robot arm above gripper.

Referring to FIG. 2, a parts sensor 78 is attached to the plate 67 near the second end 20 of the frame 16 for sensing the quantity of parts 12 at the bottom of the chute 32 to allow the computer control system to actuate the hopper conveyor 30 if more parts 12 need to be supplied to the chute 32. Parts sensor for hopper volume control can also be a three-beam sensor mounted lower in the chute area.

In use, parts 12 are supplied to the hopper conveyor 30 from bulk containers (not shown) and the hopper conveyor 30 transports the parts 12 to the chute 32 where the parts 12 are transported by the feed conveyor 44 from the chute 32 to the parts pan 48. As parts 12 are dumped into the parts pan 48, the first pivot actuator 54 will extend and tilt the parts pan 48 towards the second return conveyor 60, thereby, dumping the parts 12 from the parts pan 48 onto the second return conveyor 60. The first pivot actuator 54 then retracts so that the parts pan 48 is level to receive more parts 12 from the feed conveyor 44. After receiving more parts 12 from the feed conveyor 44, the second pivot actuator 56 then tilts the parts pan 48 towards the first return conveyor 58, thereby dumping the parts onto the first return conveyor 58. Dumping parts 12 first to the second return conveyor 60 and then to the first return conveyor 58 represents one complete cycle of the parts pan 48.

After the second return conveyor 60 has received parts 12 from the parts pan 48, the parts 12 settle and the second return conveyor 60 is actuated to move the parts 12 into the operating range of the robotic arm 14, whereupon the computer control system enables the robotic arm 14 to select and pick a desired part 12 and then reorient that picked part to any desired location for processing, e.g., packaging or assembly.

After the parts pan 48 has dumped parts 12 onto the first return conveyor 58, the parts 12 settle and the first return conveyor 58 transports the parts into the operating range of the robotic arm 14 whereupon the computer control system enables the robotic arm 14 to select and pick a desired part 12 to thereafter be reoriented as described above.

Once the robotic arm 14 has selected and picked a part 12 from either of the first and second return conveyors 58, 60, parts 12 not selected and picked and which remain on the return conveyors 58, 60 are transported by the return conveyors 58, 60 back to the chute 32 to be recycled to the feed conveyor 44 whereafter they will be conveyed by the feed conveyor 44 back to the parts pan 48 and then to the return conveyors 58, 60.

Thus, by providing multiple return conveyors 58, 60 which alternately transport parts 12 into the operating range of a computer controlled robotic arm 14, the robotic arm 14 is supplied with a constant flow of parts 12 so that the robotic arm 14 has a continuous supply of parts 14 which have settled and are suitable for selection.

In a preferred embodiment, the parts feeder of the present invention includes an enclosure 80 attached to the frame 16. The enclosure 80 may be used to house controls and equipment associated with the parts feeder 10 and the automated parts processing system.

From the above disclosure of the detailed description of the present invention and the preceding summary of the preferred embodiment, those skilled in the art will comprehend the various modifications to which the present invention is susceptible. For example, although dual return conveyors 58, 60 are shown and described, one or multiple conveyors may be used as operational requirements dictate. Similarly, multiple robotic arms 14 may be used simultaneously or in conjunction with one or more return conveyors. In addition, return conveyors 58, 60 may provide vibratory movement of parts 12 rather that alternating linear movement. Therefore, I desire to be limited only by the scope of the following claims and equivalents thereof.

I claim:

1. A parts feeder for supplying parts from bulk storage to an automated parts processing system, the parts feeder comprising:

a frame having a first end and a second end;

a hopper proximate the second end of the frame;

a hopper conveyor associated with the hopper for transporting parts from the bulk storage to said second end of the frame;

a chute disposed downstream from the hopper and receiving parts from the hopper;

a feed conveyor disposed downstream from the chute for transporting parts toward the first end of the frame;

at least one return conveyor for transporting parts to an operable range of the automated parts processing system and for returning parts to said chute; and a parts diverter proximate the first end of the frame and adapted to accept parts from the feed conveyor and direct them toward the at least one return conveyor.

2. The parts feeder of claim 1 further comprising:

a mount attached to the frame and adapted to support the automated parts processing system.

3. The parts feeder of claim 2 wherein said mount includes at least one plate having a plurality of mounting holes adapted to receive fasteners for securing the automated parts processing system to the plate.

4. The parts feeder of claim 3 further comprising:
a shelf selectively fastenable to said plate and adapted to receive the automated parts processing system.

5. The parts feeder of claim 1 further comprising:
a sensor for detecting the quantity of parts supplied from the hopper to the chute.

6. The parts feeder of claim 5 further comprising:
a mount attached to the frame and said sensor is attached to the mount at a position above the chute.

7. The parts feeder of claim 1 further comprising:
a plurality of wheels attached to the base of the frame to facilitate movement of the parts feeder to a desired location.

8. The parts feeder of claim 1 further comprising:
a plurality of lockable feet attached to the base of the frame for preventing movement of the parts feeder.

9. The parts feeder of claim 1, wherein said hopper is pivotally mounted to the frame so as to be located substantially against said frame when the parts feeder is not in use.

10. The parts feeder of claim 1 wherein the at least one return conveyor is at least translucent.

11. The parts feeder of claim 10 further comprising:
a light source located below the at least one return conveyor and wherein the automated parts processing system is adapted to visually inspect the parts.

12. The parts feeder of claim 1 further comprising:
a first return conveyor and a second return conveyor, wherein the parts diverter alternately diverts parts to said first and second return conveyors.

13. The parts feeder of claim 12 wherein the parts diverter further comprises a pan pivotally attached to the frame and at least one pivot actuator attached to said pan for alternately tilting said pan towards said first and second return conveyors.

14. The parts feeder of claim 1 further comprising:
a plurality of the return conveyors which are alternately actuated to return the parts to said chute.

15. The parts feeder of claim 1 further comprising:
an enclosure attached to the frame for housing associated controls and equipment.

16. A parts feeder for supplying parts from bulk storage to an automated parts processing system, the parts feeder comprising:
a frame having a first end and a second end;
a hopper pivotally attached to the second end of the frame such that the hopper may be selectively pivoted to a position substantially against the frame when the parts feeder is not in use; and
a hopper conveyor associated with the hopper for transporting parts from the bulk storage to said second end of the frame;
a chute disposed downstream from the hopper and receiving parts from the hopper;
a feed conveyor disposed downstream from the chute for transporting parts toward the first end of the frame;
first and second return conveyors for transporting parts to an operable range of the automated parts processing system and for returning parts to said chute, the first and second return conveyors being at least translucent;
at least one light source located beneath the return conveyors to aid the automated parts processing system in visually inspecting the parts;
a parts diverter pan pivotally attached proximate the first end of the frame;
at least one pivot actuator attached to the pan for tilting the pan;
whereby the parts diverter pan accepts parts from the feed conveyor and alternatingly transfers parts onto the first and second return conveyors;
a mount attached to the frame and including at least one plate having a plurality of mounting holes adapted to receive fasteners for securing the automated parts processing system to the plate;
a shelf selectively attached to the plate and adapted to receive the automated parts processing system; and
an enclosure attached to the frame for housing controls and associated equipment.

17. A system for processing parts from bulk storage, the system comprising:
a robotic arm adapted to locate and select parts presented to an operating range of the robotic arm;
a frame having a first end and a second end;
a hopper proximate the second end of the frame;
a hopper conveyor associated with the hopper for transporting parts from the bulk storage to said second end of the frame;
a chute disposed downstream from the hopper and receiving parts from the hopper;
a feed conveyor disposed downstream from the chute for transporting parts toward the first end of the frame;
at least one return conveyor for transporting parts to an operating range of the robotic arm and for returning parts to said chute; and
a parts diverter proximate the first end of the frame and adapted to accept parts from the feed conveyor and direct them toward the at least one return conveyor.

18. The system of claim 17 further comprising:
a first return conveyor and a second return conveyor, wherein the parts diverter alternately diverts parts to said first and second return conveyors.

19. The system of claim 18 wherein the parts diverter is a pan pivotally attached to the frame and at least one pivot actuator attached to said pan for alternately tilting said pan towards said first and second return conveyors.

20. A system for processing parts from bulk storage, the system comprising:
a frame having a first end and a second end;
a hopper pivotally attached to the second end of the frame such that the hopper may be selectively pivoted to a position substantially against the frame when the parts feeder is not in use;
a hopper conveyor associated with the hopper for transporting parts from the bulk storage to said second end of the frame;
a chute disposed downstream from the hopper for receiving parts from the hopper;
a feed conveyor disposed downstream from the chute for transporting parts toward the first end of the frame;
first and second return conveyors for transporting parts to an operating range of a robotic arm and for returning parts to said chute, the first and second return conveyors being at least translucent;
at least one light source located beneath the first and second return conveyors to aid the in visually inspecting the parts;
a parts diverter pan pivotally attached proximate the first end of the frame;

at least one pivot actuator attached to the pan for tilting the pan;

whereby the parts diverter pan accepts parts from the feed conveyor and alternatingly transfers parts onto the first and second return conveyors;

a mount attached to the frame and including at least one plate having a plurality of mounting holes adapted to receive fasteners for securing the automated parts processing system to the plate;

a shelf selectively attached to the plate and adapted to receive the automated parts processing system;

an enclosure attached to the frame for housing controls and associated equipment; and a robotic arm attached to the shelf and adapted to locate and select parts presented to an operating range of the robotic arm.

\* \* \* \* \*